UNITED STATES PATENT OFFICE.

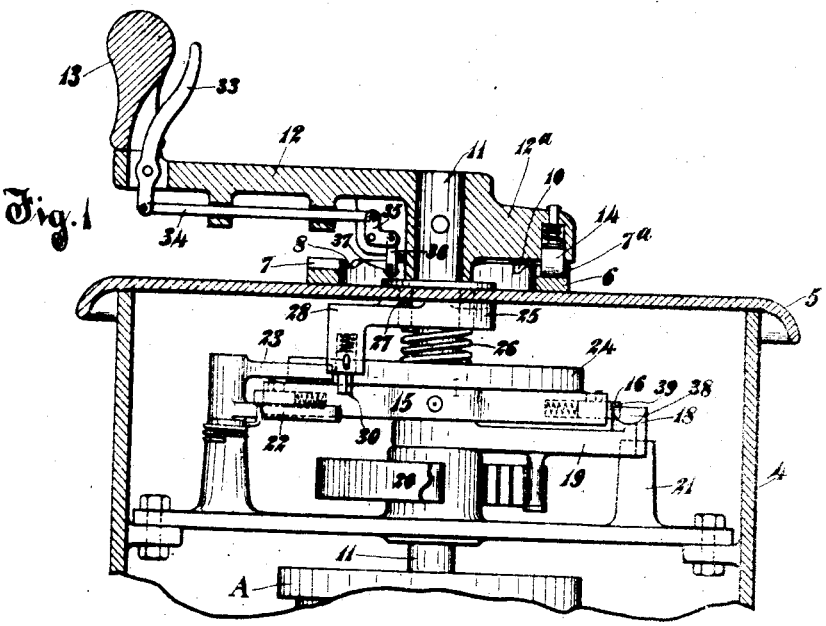

CARL FLEMING, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

CONTROLLER-OPERATING MECHANISM.

No. 872,720.

Specification of Letters Patent.

Patented Dec. 3, 1907.

Application filed January 31, 1907. Serial No. 354,962.

*To all whom it may concern:*

Be it known that I, CARL FLEMING, a subject of the King of Sweden, residing at Norwood, in the county of Hamilton and State of Ohio, have invented certain new and useful Improvements in Controller-Operating Mechanism, of which the following is a full, clear, and exact specification.

My invention relates to starting controllers for electric motors, and particularly to devices for rendering such controllers foolproof.

In operating starting devices for some types of motors, especially in potential starters for induction motors, it is often undesirable that the controller be moved backward from a "running" to a "starting" position. To this end controllers have been designed which move directly from the "running" to the "off" position without passing through the "starting" positions, and in which means are provided for preventing the controller from being moved backward from a "running" to a "starting" position, or from an "off" position directly to a "running" position, while allowing a backward movement of the controller from any "starting" position. It is possible however for controllers such as these to be left in a "starting" position indefinitely instead of being moved to a "running" position as soon as the motor has gained sufficient speed. As the various windings which are connected in circuit when the controller is in a "starting" position may not be proportioned to carry current continuously but only for a brief period during starting, the result of leaving the controller indefinitely in a "starting" position may be to cause such windings to be burned out.

In the co-pending application of Herbert W. Cheney, No. 344,685 filed Nov. 23rd, 1906, a device is shown whereby it is made impossible for an operator to leave the controller in a "starting" position, arrangements being made whereby the controller is automatically moved backward to "off" position if it is released by the operator while it is in a "starting" position. My present invention is intended to be an improvement on the device set forth in said application. With my invention it is not necessary in the ordinary operation of the controller for the operator in the same movement which operates the controller to put under strain a spring which is itself strong enough to move the controller; and moreover there is no sudden diminution of the resistance to be overcome by the operator as the controller is moved to a "running" position, and therefore no tendency to involuntarily overrun such position.

Broadly my invention comprises the combination in a controller of fixed and movable contacts, and a spring arranged to be set during an initial operation of the controller and to remain so through subsequent operations of the controller until rendered operative to return the movable contacts to "off" position.

In another aspect my invention consists of a controller for electric motors comprising a rotatable member, means which when released tends to move said member to "off" position, and two locks for said means, one of said locks being governed by the position of the controller and the other by the hand of the operator.

More specifically my invention consists of a controller for electric motors comprising a rotatable drum, contact fingers coöperating therewith, an operating handle for said drum, and a spring which after being set exerts no influence on said drum except when the operating handle is released while the controller is in a predetermined position, and then tends to move said controller to "off" position, said spring being arranged to be set by the drum-operating handle.

Other features of my invention will appear hereinafter and will be particularly pointed out in the claims.

Figure 1 is an elevation of a controller equipped with my invention, some of the parts being shown in section; Fig. 2 is a plan view of the controller of Fig. 1 with the operating handle and controller cover removed; and Fig. 3 is a development of the notched ring for preventing backward movement of the controller from certain positions.

The details of the "starting" controller proper will not be fully described or shown herein because they form no part of the present invention and are unnecessary to an understanding thereof. For what does not appear in the following description, reference is made to the aforesaid co-pending application.

Referring now to the drawings 4 is a controller casing surmounted by a cap-plate 5. Within this casing is a controller drum A of any desired construction. The operating mechanism here shown is especially designed for a controller drum having duplicate halves, respectively coöperating with two sets of diametrically opposite contact fingers during one complete operation of the controller and with the opposite sets during the next complete operation thereof. Such a controller has duplicate "off", "starting" and "running" positions as indicated in Fig. 2. The controller here shown passes through two "starting" positions between the "off" and the "running" positions, though any desired number of "starting" positions may be used. In the arrangement shown analogous positions are 180° apart. The particular construction and arrangement of the controller drum form no part of my present invention, which is equally applicable to controllers having but one "off" and one "running" position with any desired number of "starting" positions between them.

Extending upwardly from the cap-plate 5 and preferably integral therewith is a ring or plate 6 having pairs of notches 7 and 7ª, 8 and 8ª, 9 and 9ª, 10 and 10ª, which correspond respectively to the "off", "first starting", "second starting", and "running" positions of the controller. The drum A is mounted on a shaft 11 on the upper end of which fits the operating handle 12 movable by a knob 13 at its outer end.

Mounted in an extension 12ª from the handle 12 is a plunger 14 which is normally spring-pressed downward into engagement with the upper surface of the ring 6. The ring 6 is constructed so that certain of the notches, as 7, 10, 7ª and 10ª form ratchet teeth to prevent backward movement of the controller, while the remaining notches are so shaped as to allow such backward movement. All of the notches allow forward movement of the controller. Thus the ring 6 coöperating with the plunger 14 serves in the manner of the ordinary controller notch-plate to position the controller so that the operator may feel when he has reached the operative controller positions, and moreover serves to prevent backward movement of the controller from the "off" and the "running" positions.

Fixed to the shaft 11 within the controller casing 4 is a cross arm 15 in each end of which is mounted a plunger 16, spring-pressed outwardly. The movement of these plungers 16 is limited by pin and slot connections with the cross arm. In the path through which the plungers 16 travel in the movement of the controller, is an upward extension 18 forming an arm 19 mounted free to turn on the shaft 11. This arm 19 is biased in a counter-clockwise direction as by means of a coil spring 20, its movement in this direction being limited by a stop 21. As the arm 15 is moved by the rotation of the controller in a clockwise direction, it carries the arm 19 with it as long as the parts 16 and 18 are in engagement. When the part 18 reaches the position shown in dotted lines in Fig. 2, it is released from the plunger 16 by means to be described, and is engaged and held against counter-clockwise movement by a spring-pressed latch 22.

Integral with the latch 22 is an arm 23 which extends inwardly into the path traveled by the rim of a disk 24 integral with the cross arm 15 or otherwise fixed to the shaft 11. The periphery of the disk 24 is notched as shown in Fig. 2. When the notched parts of the disk are adjacent to the arm 23 the latch 22 is in its inner position with the stops 22ª and 22ᵇ in engagement as shown, but when the unnotched parts of said disk engage with said arm 23, said arm and the latch 22 are moved outwardly against the action of the spring. This movement is sufficient to separate the parts 18 and 22 if they are in engagement.

Surrounding the shaft 11 is a collar 25. This collar is movable longitudinally of the shaft 11 and is spring-pressed upwardly as by a spring 26. It is held from rotation however as by means of pins 27 extending from the cap-plate 5 into holes in extensions 28 and 29 from said collar. The extension 28 is larger than the extension 29 and is turned downward beyond the periphery of the disk 24. In the lower end of the extension 28 is mounted a spring-pressed plunger 30, the movement of which is limited by a pin and slot connection with said extension. The part of the plunger which fits in the end of the extension 28 may be of any desired shape and is here shown round. But the part which normally extends out from the extension 28 has at least two flat sides 31 and 32, as shown in Fig. 2. The collar 25 with its attached parts may be moved downwardly against the action of the spring 26 by pressing a grip lever 33 adjacent to the knob 13. This grip lever 33 is connected through a link 34 and bell-crank lever 35 to a rod 36, in the end of which is a roller 37 which travels on the upper surface of the collar 25. When the collar 25 is in its upper position, as shown in Fig. 1, the projection 18 will pass under the lower end of the plunger 30 without touching it. When the collar 25 is depressed, the plunger 30 is in the path of the pawl 18. In the movement of the arm 19 in a clockwise direction, the plunger 30 is pushed into the extension 28 by the inclined upper surface 38 of the projection 18; but if the projection 18 is moved past the plunger 30, it is prevented from moving in the counter-clockwise direction so long as the collar 25 with its attached parts is kept depressed. Whether the collar 25 is depressed or not, the plunger 30 is in the path of the plungers 16. Consequently as the cross arm 15 is moved in a clockwise direction, the inclined surface 39 on the plunger 16 engages with the surface 32 on the plunger 30, and the plunger 16 is moved inwardly and disengaged from the projection 18.

The operation of the device is as follows:— When the controller is in "off" position with the plunger 14 in engagement with the notch 7 or 7ª and before the arm 19 has been set in the position shown by dotted lines in Fig. 2, the projection 18 is in engagement with one of the spring-pressed plungers 16. Backward movement of the drum from this position is prevented by the ratchet tooth of the notch 7 or 7ª. The controller may be moved forward however. When the operator grasps the knob 13 to move the controller forward, it is natural to press or squeeze the grip lever 33, thus depressing the collar 25 with its attached parts. When the controller is moved forward into "first starting" position, the arm 19 is moved in a clockwise direction by the engagement of the parts 16 and 18. In this movement of the controller the spring 20 is partially wound up so that should the controller handle be released by the operator while in this "starting" position, the spring will return it to "off" position, as the notches 8 and 8ª permit backward movement of the controller. In the movement of the controller to the "first starting" position, the disk 24 engages the arm 23 to move the latch 22 outward. As the arm 19 has not been set, the depression of the collar 25 and the movements of the latch 22 play no part in this initial operation of the controller at this time. As the controller is moved to the "second starting" position, the spring 20 is farther wound up, and as the notches 9 and 9ª also permit backward movement, will still act to move the controller backward to "off" position should the knob 13 be released by the operator. As the controller is moved forward from the "second starting" position to the "running" position, the surface 38 of projection 18 engages the spring-pressed plunger 30 and raises it so that said projection 18 may pass under it. As soon as the projection 18 has fully passed under the plunger 30, said plunger drops down and prevents backward movement of the arm 19. About this same time the surface 39 on plunger 16 engages the surface 32 on plunger 30 to move the former of said plungers inward and separate it from the projection 18. The arm 15 in its further movement does not carry the arm 19 with it. Although the forward movement of the arm 19 ceases at this time it is prevented from moving backward because of the engagement between the side of the projection 18 and the surface 31 on the plunger 30. Moreover, as the controller approaches "running" position, the cut-away part of the disk 24 is brought around adjacent to the arm 23, thus allowing said arm and the latch 22 to return to their normal or inner positions so that said latch engages the projection 18 to also prevent backward movement of the arm 19. Thus in "running" position, the controller drum is free from any influence of the spring 20 and the knob 13 may be released by the operator without any danger of the controller being moved backward. Indeed, backward movement from this "running" position is impossible because of the ratchet teeth formed by the notches 10 and 10ª. As the knob 13 is released by the operator the grip lever 33 moves outward and the collar 25 upward under the influence of the spring 26, thus disengaging the plunger 30 from the projection 18. However, with the controller in this position the latch 22 holds the arm 19 from counter-clockwise movement under the influence of spring 20. The controller now being in "running" position it can be moved forward freely to the "off" position, this "off" position being diametrically opposite the "off" position from which the movement above described, started. When it is desired to move the controller again from "off" position, the knob 13 is grasped and the grip lever 33 pressed to depress the collar 25 and its attached parts. Thus the plunger 30 is again moved downward so that its surface 31 engages with the side of the projection 18 to prevent the backward movement of the arm 19. As the controller is moved forward to the "first starting" position the disk 24 moves the latch 22 out of engagement with the projection 18 on the arm 19, at which time said arm would move backward were it not for the engagement between the parts 18 and 30. In either the "first starting" or the "second starting" position the releasing of the knob 13 and grip lever 33 by the operator and the consequent disengagement of the parts 18 and 30 would allow the arm 19 to swing backward or counter-clockwise toward and against the stop 21. In this movement the projection 18 would strike one of the plungers 16 and carry the controller drum A back with it to "off" position. As the controller is moved forward to the "running" position, the operator's grasp on the lever 33 not having been released with the controller in either of the "starting" positions, the surface 39 of the plunger 16 engages the surface 32 of the plunger 30, and pushes said plunger 16 inward to allow it to pass by the parts 30 and 18, and the cut-away part of the disk 24 moves around adjacent to the arm 33 to allow the latch 22 to again swing inward to engage the projection 18 to prevent backward movement of the arm 19. With the controller in "running" position the knob 13 and lever 33 may be safely released by the operator, as the disengagement of the parts 18 and 30 at this time does not allow the arm 19 to move backward because of the engagement between the parts 18 and 22.

From the "running" position the controller may be moved forward freely to the "off" position, this "off" position being diametrically opposite the one it has just left.

The operation above described may be repeated as often as desired, the arm 19 and spring 20 remaining set as long as the knob 13 and grip lever 32 are properly grasped by the operator from the time the controller moves from "off" position until it reaches the "running" position. Should the operator release the lever 33 before the controller reaches the "running" position, the arm 19 will be released and the controller moved backward to "off" position. In the next operation after the arm 19 has been thus released, the operator must not only move the controller, but must also wind up the spring 20 to set the arm 19. This will effectively serve to prevent the operator from improperly releasing his grasp on the knob 13 and the grip lever 33. In the description and claims the operation of the controller in which the arm 19 is set is referred to as an "initial" operation, while the operations with it set are referred to as "subsequent" operations.

In constructing a controller in accordance with my invention it is not necessary to adhere to the precise arrangement here shown and described, but many modifications and substitutions may be made without departing from the spirit and scope of my invention. For instance the notch plate 6 may be mounted to rotate with the shaft while the plunger 14 is stationary. All such obvious modifications I aim to cover in the following claims.

What I claim as new and desire to secure by Letters Patent is:—

1. A controller for electric motors, comprising fixed and movable contacts, means which when released tends to move the movable contact to "off" position, and two locking devices for said means.

2. A controller for electric motors, comprising fixed and movable contacts, means which when released tends to move the movable contact to "off" position, and a plurality of locking devices for said means, one of said locking devices being released when the movable contact is in a predetermined position.

3. A controller for electric motors, comprising fixed and movable contacts, an operating handle, means which when released tends to move the movable contact to "off" position, and two locking devices for said means, one of said locking devices being released when the operating handle is released by the operator.

4. A controller for electric motors, comprising fixed and movable contacts, an operating handle, means which when released tends to move the movable contact to "off" position, and two locking devices for said means, one of said locking devices being released when the operating handle is released by the operator and the other when the movable contact is in a predetermined position.

5. A controller for electric motors, comprising a rotatable drum, means which when released tends to move said drum to "off" position, and a plurality of independent locking devices, all of which must be in unlocked condition simultaneously to release said means.

6. A controller for electric motors, comprising a rotatable drum, means which when released tends to move said drum to "off" position, and a plurality of independent locking devices, more than one of which must be in unlocked condition at the same time in order to release said means.

7. A controller for electric motors, comprising a rotatable drum, means which when released tends to move said drum to "off" position, and two locks for said means, one of said locks being governed by the position of the controller and the other by the hand of the operator.

8. In a controller, contact fingers, a rotatable drum coöperating therewith, a spring which after being set tends to move said drum to "off" position only when the latter is released when in predetermined positions, and a single handle for moving the drum and for setting the spring.

9. In a controller, contact fingers, a rotatable drum coöperating therewith, said drum having "off", "starting" and "running" positions, a spring which after being set tends to move said drum to "off" position only when the latter is released when not in "off" position or "running" position, and a single handle for operating the drum and setting the spring.

10. In a controller, a rotatable drum, fixed contacts with which said drum coöperates, means which after being set tends to move said drum toward "off" position when the latter is released in certain operative positions but exerts no influence on the drum when it is in certain other operative positions and when not released in the first mentioned positions, and a single handle for rotating the drum and for setting said means.

11. A controller for electric motors, comprising a rotatable drum, fixed contacts coöperating therewith, means whereby said drum is biased toward "off" position when released in any "starting" position, but unbiased in "running" position and also in "starting" position when not released, and a plurality of locking devices for said means.

12. In a controller, contact fingers, a rotatable drum coöperating therewith, a spring which after being set tends to move said drum to "off" position only when the latter is released when in predetermined positions, a single handle for moving the drum and for setting the spring, and a plurality of locking devices for holding said spring in its set condition.

13. A controller for electric motors, comprising a rotatable drum, contact fingers coöperating therewith, a spring-pressed lever, means for locking said lever with the spring under tension when the controller is in a predetermined position, and other means for locking said lever when the controller handle is properly grasped by the operator.

14. A controller for electric motors, comprising a rotatable drum, contact fingers coöperating therewith, means for preventing backward movement of the controller from certain positions, a spring which tends to move the controller to "off" position under certain conditions when said controller is in a position from which it may be moved backward, and a plurality of devices for locking said spring under strain.

15. A controller for electric motors, comprising a rotatable drum, contact fingers coöperating therewith, means for preventing backward movement of the controller from certain positions, a spring which after being set tends to move the controller to "off" position only when the latter is released in a position from which it may be moved backward, and a single handle for moving the controller and for setting the spring.

16. A controller for electric motors, comprising a rotatable drum, an operating handle therefor, means which when released tends to move said drum to "off" position, and locking devices so arranged that said means is released only when the operating handle is not properly grasped by the operator when the controller is in predetermined positions.

17. In a controller, a movable member, a spring arranged to be put under strain in an initial operation of the controller, and means for holding said spring under tension in subsequent operations of the controller unless the operator fails to grasp the controller handle properly when the movable member is in predetermined positions, said spring when released tending to move the movable member to "off" position.

18. In a controller, fixed and movable members, and a spring arranged to be set during an initial forward operation of the controller and to remain so through subsequent operations of the controller until rendered operative to return the movable member to "off" position.

19. In a controller, fixed and movable members, and a spring arranged to be set during an initial operation of the controller and to remain so through subsequent operations of the controller until rendered operative to return the movable member to "off" position by releasing the controller handle with the controller in predetermined positions.

20. In a controller, fixed and movable members, a spring, means for putting said spring under strain in an initial forward operation of the controller, means for normally maintaining said spring under strain through subsequent operations of the controller, and means for rendering said spring operative under predetermined conditions.

In testimony whereof I affix my signature in the presence of two witnesses.

CARL FLEMING.

Witnesses:
 GEO. B. SCHLEY,
 FRED J. KINSEY.